United States Patent
Eidenschink

(10) Patent No.: US 9,888,470 B2
(45) Date of Patent: *Feb. 6, 2018

(54) NETWORK ACCELERATOR FOR CONTROLLED LONG DELAY LINKS

(71) Applicant: ViaSat, Inc., Carlsbad, CA (US)

(72) Inventor: Thomas Eidenschink, Carlsbad, CA (US)

(73) Assignee: VIASAT, INC., Carlsbad, CA (US)

(*) Notice: Subject to any disclaimer, the term of this patent is extended or adjusted under 35 U.S.C. 154(b) by 128 days.

This patent is subject to a terminal disclaimer.

(21) Appl. No.: 15/048,895

(22) Filed: Feb. 19, 2016

(65) Prior Publication Data

US 2016/0270044 A1     Sep. 15, 2016

Related U.S. Application Data

(63) Continuation of application No. 14/221,975, filed on Mar. 21, 2014, now Pat. No. 9,301,312, which is a
(Continued)

(51) Int. Cl.
*H04L 12/70* (2013.01)
*H04L 12/26* (2006.01)
(Continued)

(52) U.S. Cl.
CPC .......... *H04W 72/044* (2013.01); *H04B 7/185* (2013.01); *H04B 7/18513* (2013.01);
(Continued)

(58) Field of Classification Search
CPC ...... H04L 43/0852; H04L 2012/05608; H04B 7/185; H04B 7/1851; H04B 7/18578; H04B 7/18595
See application file for complete search history.

(56) References Cited

U.S. PATENT DOCUMENTS 6,208,640 B1   3/2001   Spell et al.
6,282,542 B1   8/2001   Carneal et al.
(Continued)

FOREIGN PATENT DOCUMENTS

IL          182627         9/2012
WO   WO-2001/069813 A2   9/2001
WO   WO-2006/055944 A2   5/2006

OTHER PUBLICATIONS

Extended European Search Report mailed in European Patent Application No. 05825156.2 dated Mar. 1, 2012, 10 pgs.
(Continued)

*Primary Examiner* — Christopher Crutchfield

(57) ABSTRACT

A communication system for providing network access over a shared communication link is disclosed. The communication system includes a user access point, a network access point and a communications link. The user access point is coupled to one or more user terminals that access a remote network. The network access point is coupled to the remote network. The communications link couples the user access point and the network access point. The communications link is at least partially controlled by the network access point, which monitors information passed between the remote network and the user access point to create an estimate of future usage of the communications link by the user access point based on the information. The network access point allocates communications link resources for the user access point based on the estimate.

19 Claims, 5 Drawing Sheets

Related U.S. Application Data continuation of application No. 13/719,104, filed on Dec. 18, 2012, now Pat. No. 8,719,409, which is a continuation of application No. 12/830,188, filed on Jul. 2, 2010, now Pat. No. 8,359,387, which is a continuation of application No. 11/282,359, filed on Nov. 17, 2005, now Pat. No. 7,769,863.

(60) Provisional application No. 60/629,817, filed on Nov. 19, 2004.

(51) Int. Cl.
  *H04L 12/24* (2006.01)
  *H04L 12/911* (2013.01)
  *H04L 29/06* (2006.01)
  *H04L 29/08* (2006.01)
  *H04W 72/04* (2009.01)
  *H04W 74/00* (2009.01)
  *H04W 72/10* (2009.01)
  *H04B 7/185* (2006.01)

(52) U.S. Cl.
  CPC ...... *H04L 41/0896* (2013.01); *H04L 43/0852* (2013.01); *H04L 47/70* (2013.01); *H04L 47/822* (2013.01); *H04L 47/826* (2013.01); *H04L 65/1036* (2013.01); *H04L 67/02* (2013.01); *H04L 67/22* (2013.01); *H04L 67/28* (2013.01); *H04L 67/2819* (2013.01); *H04L 67/322* (2013.01); *H04L 69/24* (2013.01); *H04W 72/10* (2013.01); *H04W 74/004* (2013.01); *H04L 47/781* (2013.01); *H04L 47/824* (2013.01); *H04L 2012/5608* (2013.01)

(56) References Cited

U.S. PATENT DOCUMENTS

| | | | |
|---|---|---|---|
| 6,463,454 B1 | 10/2002 | Lumelsky et al. | |
| 7,116,682 B1 * | 10/2006 | Waclawsky | H04J 3/1682 370/468 |
| 7,769,863 B2 | 8/2010 | Eidenschink | |
| 8,359,387 B2 | 1/2013 | Eidenschink | |
| 8,719,409 B2 | 5/2014 | Eidenschink | |
| 9,301,312 B2 | 3/2016 | Eidenschink | |
| 2001/0011300 A1 | 8/2001 | Pitts | |
| 2001/0043617 A1 | 11/2001 | McKinnon, III et al. | |
| 2001/0048670 A1 | 12/2001 | Kelly et al. | |
| 2001/0053152 A1 | 12/2001 | Sala et al. | |
| 2003/0027522 A1 | 2/2003 | Valdivia et al. | |
| 2003/0081626 A1 | 5/2003 | Naor et al. | |
| 2003/0120658 A1 | 6/2003 | Carneal et al. | |
| 2003/0123394 A1 | 7/2003 | Neale et al. | |
| 2003/0212787 A1 | 11/2003 | Qiu et al. | |
| 2004/0008726 A1 | 1/2004 | Kelly et al. | |
| 2005/0026621 A1 | 2/2005 | Febvre et al. | |
| 2005/0163059 A1 | 7/2005 | Dacosta et al. | |
| 2005/0254426 A1 | 11/2005 | Simonis | |
| 2006/0020700 A1 | 1/2006 | Qiu et al. | |
| 2006/0034167 A1 | 2/2006 | Grice et al. | |
| 2006/0109788 A1 | 5/2006 | Eidenschink | |
| 2006/0120282 A1 | 6/2006 | Carlson et al. | |
| 2010/0274901 A1 | 10/2010 | Eidenschink | |
| 2013/0132585 A1 | 5/2013 | Eidenschink | |
| 2014/0313971 A1 | 10/2014 | Eidenschink | |

OTHER PUBLICATIONS

Examination Report mailed in European Patent Application No. 05825156.2 dated Apr. 12, 2016, 7 pgs.

International Search Report and Written Opinion mailed in International Application No. PCT/US2005/042244 dated Nov. 29, 2006, 5 pgs.

International Preliminary Report on Patentability mailed in International Application No. PCT/US2005/042244 dated May 22, 2007, 4 pgs.

* cited by examiner

NETWORK ACCELERATOR FOR CONTROLLED LONG DELAY LINKS

CROSS-REFERENCES TO RELATED APPLICATIONS

This application is a continuation of U.S. Nonprovisional application Ser. No. 14/221,975, filed Mar. 21, 2014, which is a continuation of U.S. Nonprovisional application Ser. No. 13/719,104, now U.S. Pat. No. 8,719,409, filed Dec. 18, 2012, which is a continuation of U.S. Nonprovisional application Ser. No. 12/830,188, now U.S. Pat. No. 8,359,387, filed Jul. 2, 2010, which is a continuation of U.S. Nonprovisional application Ser. No. 11/282,359, now U.S. Pat. No. 7,769,863 filed Nov. 17, 2005, which claims the benefit of U.S. Provisional Application No. 60/629,817, filed Nov. 19, 2004, the entire contents of which are incorporated herein by reference in their entirety for all purposes.

BACKGROUND

This disclosure relates in general to networking and, more specifically, but not by way of limitation, to networking over controlled long delay links.

Network access via satellite link has many speed limitations imposed by the long time delay of the link. Since the bulk of the Internet is composed of landline and short wireless links, communication delay has traditionally been associated with either slow or congested links. This bias has translated into standard protocols that create typical delays for satellite users that are much longer than just the sum of the typical landline delay plus the inherent satellite transmission delay.

Since one of the main uses for the Internet is web browsing, much effort has been done to speed up the loading of web pages over long delay links. For example, "A Smart Internet Caching System" Dias, et al., Internet Society INET 1996, is directed toward the acceleration of web browsing by the use of an intelligent agent at a distant (in terms of transmission time) gateway. One function of this agent is to observe base pages as they come from web servers and pre-fetch any in-line files (for example, images) that are referred to in the base page. These files are then pushed across the long delay link to be cached for immediate access by the user upon request. Although this method can be employed on satellite links, it has serious limitations because of the overhead involved and the possibility of pushing unneeded information over the long delay link. For example, if a user is loading the home page for a shopping server, the home page may be customized to that user. In this case, the link resources would be wasted loading generic in-line elements that do not apply to the current user. As well, locally running web applications such as Java are not well served by a pre-fetching technique.

BRIEF SUMMARY

In one embodiment, the present disclosure provides a communication system for providing network access over a shared communication link. The communication system includes a user access point, a network access point and a communications link. The user access point is coupled to one or more user terminals that access a remote network. The network access point is coupled to the remote network. The communications link couples the user access point and the network access point. The communications link is at least partially controlled by the network access point, which monitors information passed between the remote network and the user access point to create an estimate of future usage of the communications link by the user access point based on the information. The network access point allocates communications link resources for the user access point based on the estimate.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
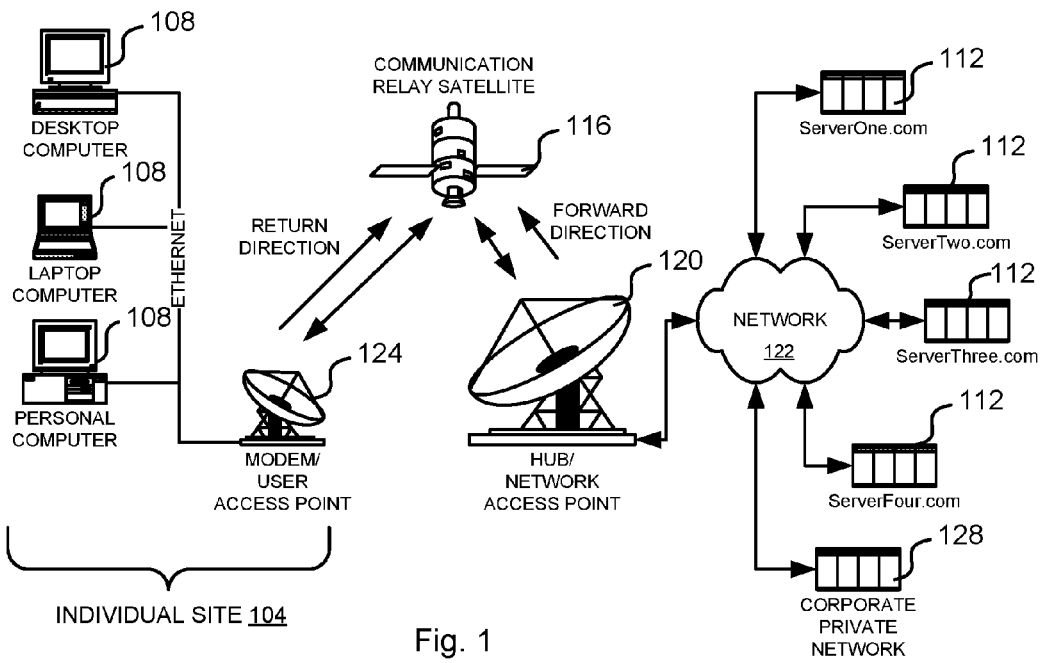
FIG. 1 is a schematic representation of the environment of the network accelerator system according to the present disclosure.

In the appended figures, similar components and/or features may have the same reference label. Where the reference label is used in the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In one embodiment of a controlled return link, a hub can monitor data to and from network servers and proactively allocate additional channel capacity to users who are anticipated to transmit further related requests. The following description uses the exemplary application of an Internet web browser using HTTP to connect to Internet servers as an illustrative embodiment of the present disclosure. It can be appreciated that the present disclosure applies to all types of applications employing any of a number of network protocols, as will be clear from the following description.

When a client (user) browser requests a base file for a web page, the server responds with a file that contains references to in-line objects such as image files that are also part of the page. The client's locally stored cookies, however, may affect what actual objects will end up getting displayed to the client. For example, unique ads or customizations may be made for the particular client. This is one reason why simply applying a pre-fetching system can yield unsatisfactory results. The forward communication link, the hub, the user access point, the Internet, and the network server are all used unnecessarily should pre-fetching gather unneeded information. The client then has to request the needed information anyway since the pre-fetch doesn't gather useful information.

The environment of the disclosure is shown in FIG. 1. One or more individual or user sites 104 are connected to a common hub or network access point 120 over a long delay link 116, for this example, a satellite link 116. The hub 120 is a central location that serves a gateway function for the individual sites 104 and transmits information to the individual sites 104 either in a common channel or through individual channels in what is called the forward direction. In this example, the forward direction is from the hub 120, through the satellite relay 116 and to the individual sites 104. The hub 120 either directly or indirectly controls the link usage of the individual sites 104, which transmit in what is called the return direction, through the relay satellite 116 and to the hub 120.

At the individual site 104 shown (one of many that may be served by the hub 120), a number of computers 108 (of potentially different operating systems and configurations) are connected through Ethernet to a user access point 124 that has a satellite modem and includes a number of functions such as network router, etc. The hub 120 is a network access point that relays information between the various users and servers 112, 128 of interest to those users, the examples given here and any other servers 112, 128 available to the users through the network access point 120.

The hub 120 controls the long delay return link by allocating return channel capacity to users based on some algorithm. This allocation can be tightly controlled such as TDMA reservation, mixed reservation/contention, or as loosely controlled as a completely contention based system. Even in a contention-based system, however, some sort of throttling mechanism is typically employed to keep the network from overloading. Note that the general problem of reserving return channel capacity is a system specific design task that is not detailed in this description, since the subject disclosure can be employed on any sort of controlled return channel.

The return channel allocation algorithm typically distributes the return channel capacity among users as a function of their priority (e.g., Quality of Service guarantees) and/or their historic usage. In general, a small amount of capacity is reserved for each individual site 104 so that they can at least request more capacity, although these requests can also be accommodated in a contention channel. Due to the random and bursty nature of network accesses, it is difficult to accurately predict the amount of return channel capacity required by an individual site 104. If an individual site 104 is allocated too much return channel capacity, then it will be able to quickly make any network requests required, but the excess return channel capacity will not be available to other users, resulting in unnecessary delays for them. If not enough return capacity is allocated to an individual site 104, then it will make its requests slowly and/or use the long delay link 116 to request greater capacity.

Figure 2:
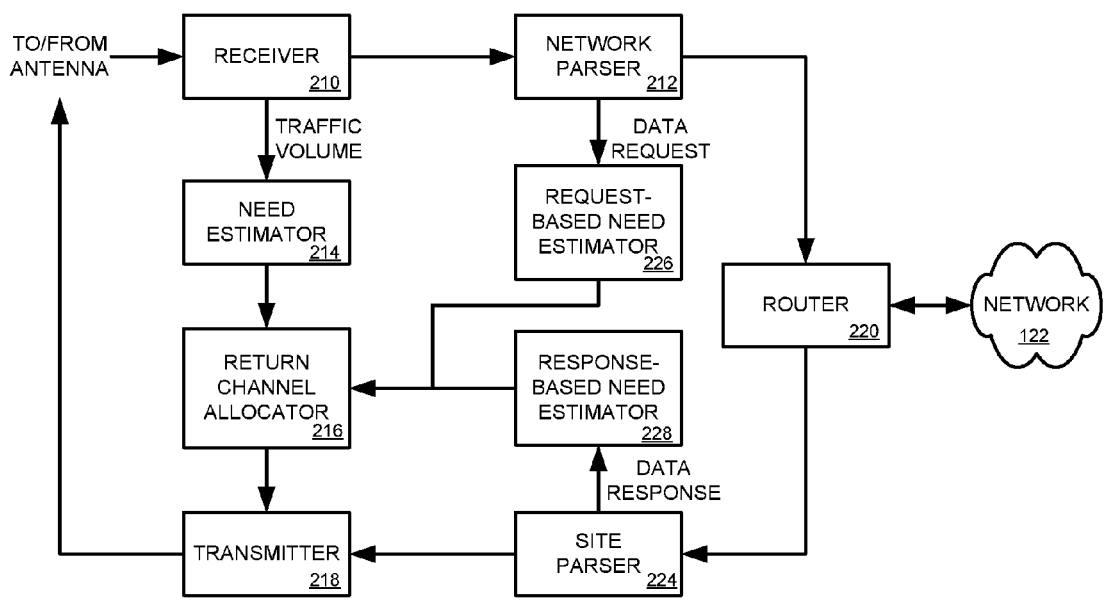
FIG. 2 is a high level block diagram of an embodiment of a portion of a hub that is relevant to the description of the disclosure.

In accordance with the disclosure, a gateway function within the hub 120 monitors the data that flows between individual sites 104 and servers 112, 128. With reference to FIG. 2, a high-level block diagram of the portion of the hub 120 that is relevant to this description of the disclosure is shown. Note that functions such as allocation of the forward channel, etc. are not included for clarity.

The receiver 210 demodulates the incoming data from the individual sites 104, extracts the outgoing network traffic and forwards it to a network parser 212. The size of the data received from the individual site 104 is also passed on to a need estimator 214, which for example maintains a simple channel usage history of the individual site 104 and delivers the future need estimate to a return channel allocater 216. In this exemplary implementation, the return channel allocator 216 uses the forward channel transmitter 218 to notify the modems 124 at individual sites 104 of their allocation, although other techniques such as side channels, etc. could alternatively be employed.

Continuing to follow the path of network traffic in FIG. 2, the network parser 212 forwards traffic, such as HTTP page requests or other traffic destined for a network 122, to the router 220, which fulfills the requests via the network 122, for example, the Internet. The router 220 also delivers the traffic received from the network 122 to a site parser 224, which analyses the traffic and forwards the data on to the transmitter 218 for delivery to the appropriate individual sites 104.

In one embodiment, a request-based need estimator 226 of the gateway function determines from incoming page requests (from the client at the individual site 104, forwarded from the network parser 212) an estimate of the anticipated future requests of that client. This estimate is then sent to the return channel allocator 216. This estimate can be based, for example, on keeping a table (either by client or globally) with columns for page (or possibly just for the page server's domain) and expected usage. The table values can be updated in any number of ways. For example, the table could be updated each time a page is accessed, typically employing a smoothing filter that biases toward recent activity.

In one embodiment, a response-based need estimator 228 determines from server page files (i.e., requested pages coming from the server 112, delivered from the site parser 224) an estimate of the anticipated future requests of that client, which is then sent to the return channel allocator 216. This estimate can be based on references to in-line elements contained in the response. This can yield an estimate of the future return channel needs, but the gateway function waits for the page request to be filled before making the estimate in this embodiment.

Figure 3:
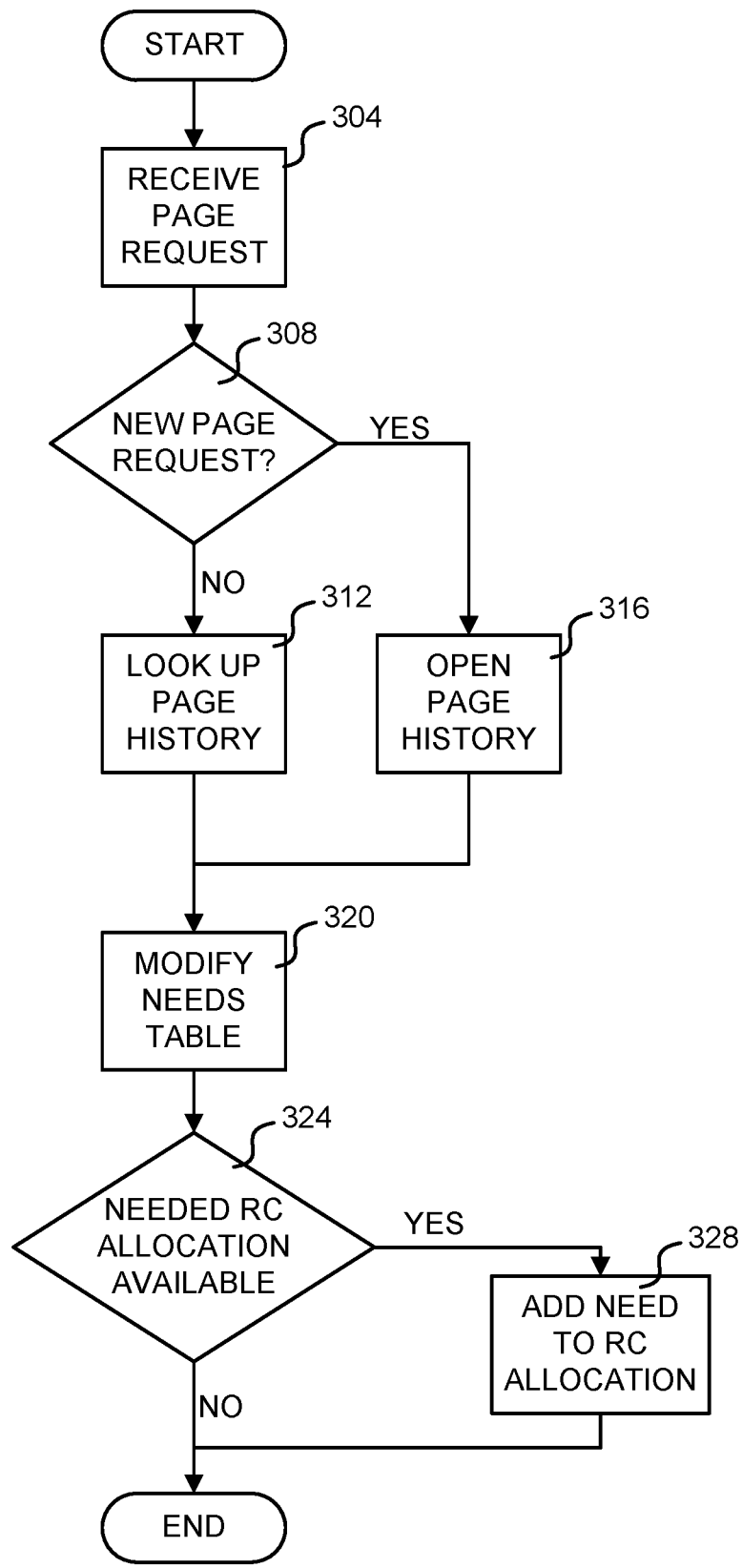
FIG. 3 is an exemplary flow chart of the operation of the disclosure of a gateway function.

FIG. 3 is an exemplary flow chart of the operation of one embodiment of the disclosure of the gateway function in the hub portion. The depicted portion of the process starts in step 304 upon receipt of a data request, in this example, a web page request from an individual site 104. The request is, of course, forwarded on to the network 122, although not shown in this flow chart. If the page request is new in that the uniform resource locator (URL) or a portion of the URL cannot be matched to another URL as determined in step 308, then a new page history is opened for the requested page in step 316. In some embodiments, URLs may be deemed to match where there isn't an exact match as metadata in the URL can cause matching to be difficult. Note that the page history is subject to time-out for a number of reasons including limited storage space at the gateway. Obviously, older page histories are less relevant and would be targeted for replacement if there were a table space allocation issue, although certain high priority clients and/or servers 112 and their associated page histories could be maintained as desired. When a page history times out, it is removed from a table or database holding the page history.

If a new page history is opened, then a default return channel need profile is generated. This profile could be null, but would ideally represent a level of need that would give an individual user a reasonable level of service without overloading the return channel if a large number of users were granted the capacity simultaneously. The level of need could be an average for the domain of the URL, a portion of the URL and/or all domains. The sole table shows allocation for particular pages. In this simplified example, profiles for four web pages are stored such that requests for those pages results in an increase in the allocation for the return direction to service the requests likely to follow the web page.

TABLE

Allocations for Pages

| Web Page | Allocation in Kbps |
|---|---|
| realure.com/acme.htm | 30 |
| nesbittea.org/contact.htm | 80 |
| lucenarity.info/sitemap.htm | 10 |
| videodlserver.com/spec.html | 200 |

If the page request is not new, then a page history already exists and is looked up in step 312. This history can be of a number of equivalent forms: average bit rate needed versus time, specific burst times and sizes, etc. Page histories can be maintained on an individual user basis, individual site basis and/or system-wide. For example, the system-wide average return channel capacity requirement could be employed for a user upon first viewing of a web page that had previously been visited by other users. As the user continues to revisit the page, the usage history would then determine the allocation required.

The estimated needs for the subject individual site 104 is modified in step 320 by the estimate derived above. This estimate is then input into the return channel allocation algorithm and added to the allocation for the individual site 104 in step 328 if the capacity is available on the return channel (RC) as determined in step 324. This embodiment may wait for the web page to be returned to the hub 120 before modifying the RC allocation for the individual site 104 or could have the change become effective at a time relative to when the user access point 124 receives the web page, but other embodiments could send a message to the modem 124 to increase the RC allocation once the request is correlated to others. One embodiment tries to predict when the return channel will receive the requests for the in-line objects and has the RC allocation timed to coincide with that event. Note that any of a number of known techniques can be used to allocate the capacity, as mentioned previously.

Figure 4:
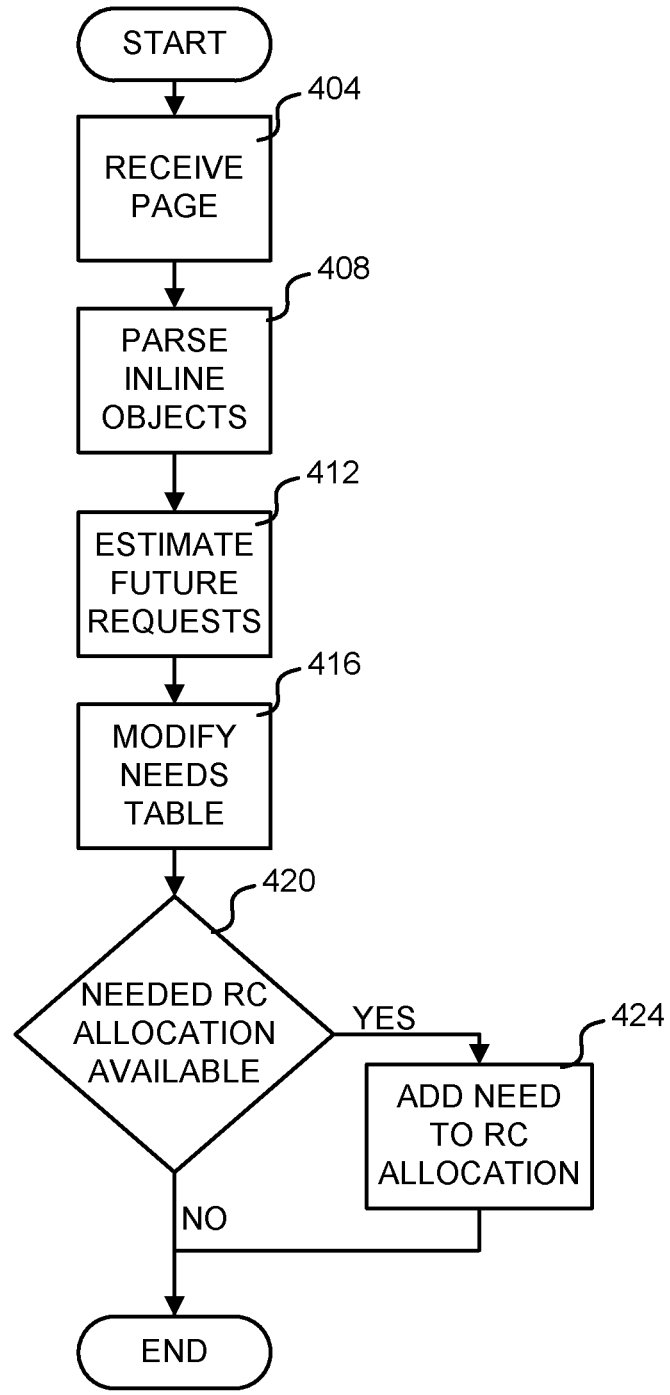
FIG. 4 is a flow chart of another embodiment of the operation of the disclosure of the gateway.

FIG. 4 is a flow chart of an embodiment that uses a response-based need estimator 228 to determine from server page files (i.e., requested pages coming from the server 112, delivered from the site parser 224) an estimate of the anticipated future requests of that client, which is then sent to the return channel allocator 216. After data is received from the server 112 in step 404, it is relayed on the forward satellite channel to the client modem 124. The page is also parsed by the site parser 224 in step 408 to determine if there are any in-line objects, etc. that indicate potential user return channel needs in step 412. A typical application of the algorithm would be to count the number of inline items, estimate the return channel capacity needed to request each one, and then total the estimates. The needs table for that individual site 104, discussed previously, would then be updated accordingly in step 416. Finally, as in the previous embodiment, the needs for this individual site 104 would be integrated together with the needs from all the other sites 104 to determine the return channel allocation in steps 420 and 424. For example, a large need of one individual site 104 may not be completely allocated where other sites 104 are consuming a large portion of the channel.

Figure 5:
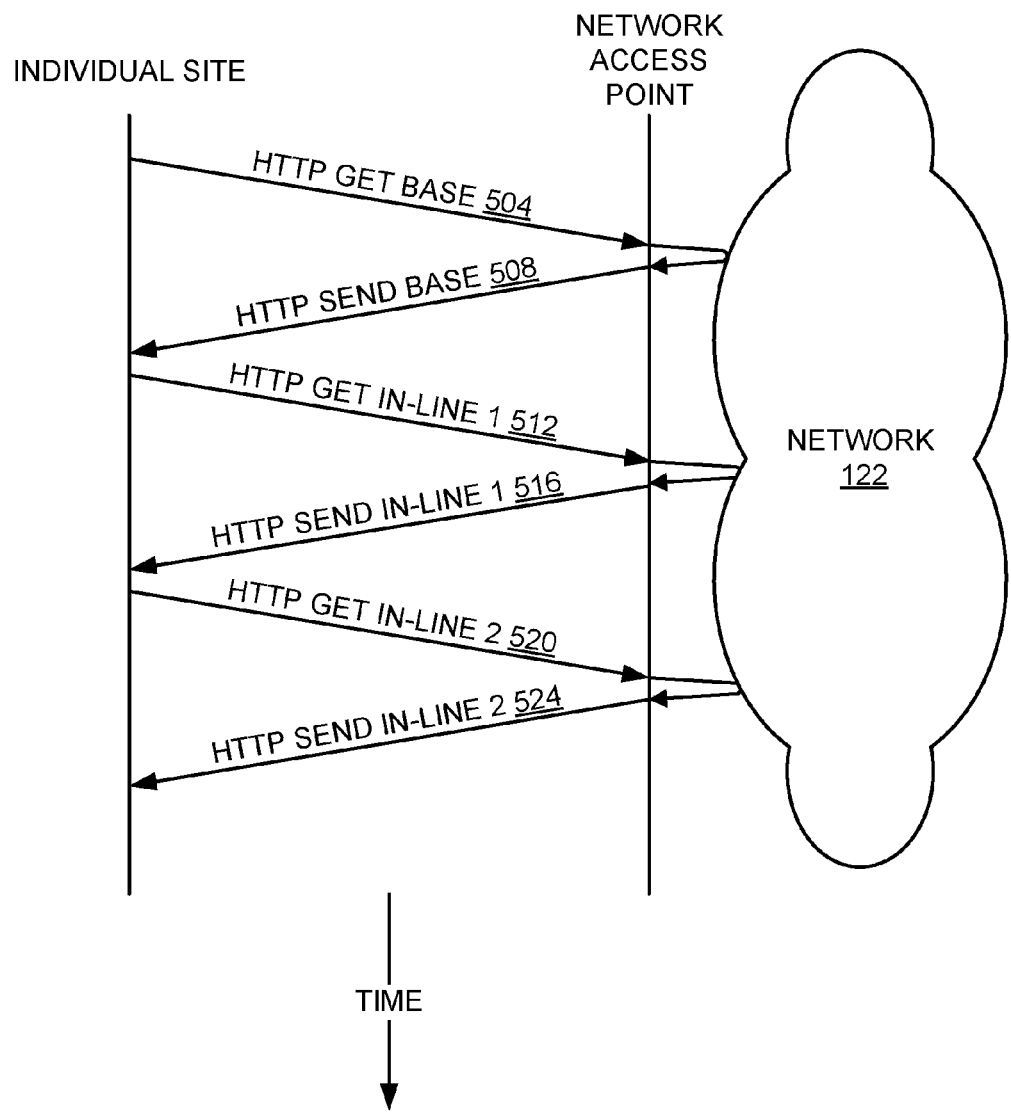
FIG. 5 is a data flow diagram depicting a transaction in which conventional techniques are used to obtain a base HTTP page with two in-line elements.

FIG. 5 depicts data flows for a transaction in which conventional techniques are used to obtain a base HTTP page with two in-line elements. Message transfers are depicted by lines that slope downward with the flow of time where the longer a transfer takes the steeper its slope. The process starts with a user requesting a base page in step 504, which goes across the long-delay satellite link 116 to the network access point or hub 120. Note the significant slope of the 'HTTP GET BASE' line 504, because of the delay of the link 116. The network access point 120 then quickly obtains the resulting page from the network 122, depicted by the looping line that returns quickly (in a short distance down the page) to the network access point 120. The network access point 120 then forwards the base page from the server 112 to the user in step 508, again on the long-delay link 116.

In this example, the user only has capacity to request a single item per round-trip period, so after a short processing delay, the user requests the first in-line element of the base page via the 'HTTP GET IN-LINE 1' request 512. The network access point 120 then quickly obtains the resulting in-line element from the network, depicted by the second looping line that returns quickly (in a short distance down the page) to the network access point 120. The network access point 120 then forwards the in-line element to the user in step 516, again on the long delay link 116. After a short processing delay, the user requests the second in-line element of the base page via the 'HTTP GET IN-LINE 2' request 520. The network access point 120 then quickly obtains the resulting in-line element from the network, depicted by the third looping line that returns quickly (in a short distance down the page) to the network access point 120. The network access point 120 then forwards the in-line element to the user in step 524, again on the long delay link 116.

Note that in this example, even if the user were able to request additional capacity from the network access point 120, any response would not arrive much before the first in-line element, thus making the request moot, since after arrival of the first in-line element, the user would be able to request the second and final in-line element anyway. The web browser or other application software of the user's computer 108 renders the base page and in-line elements as they are received.

Figure 6:
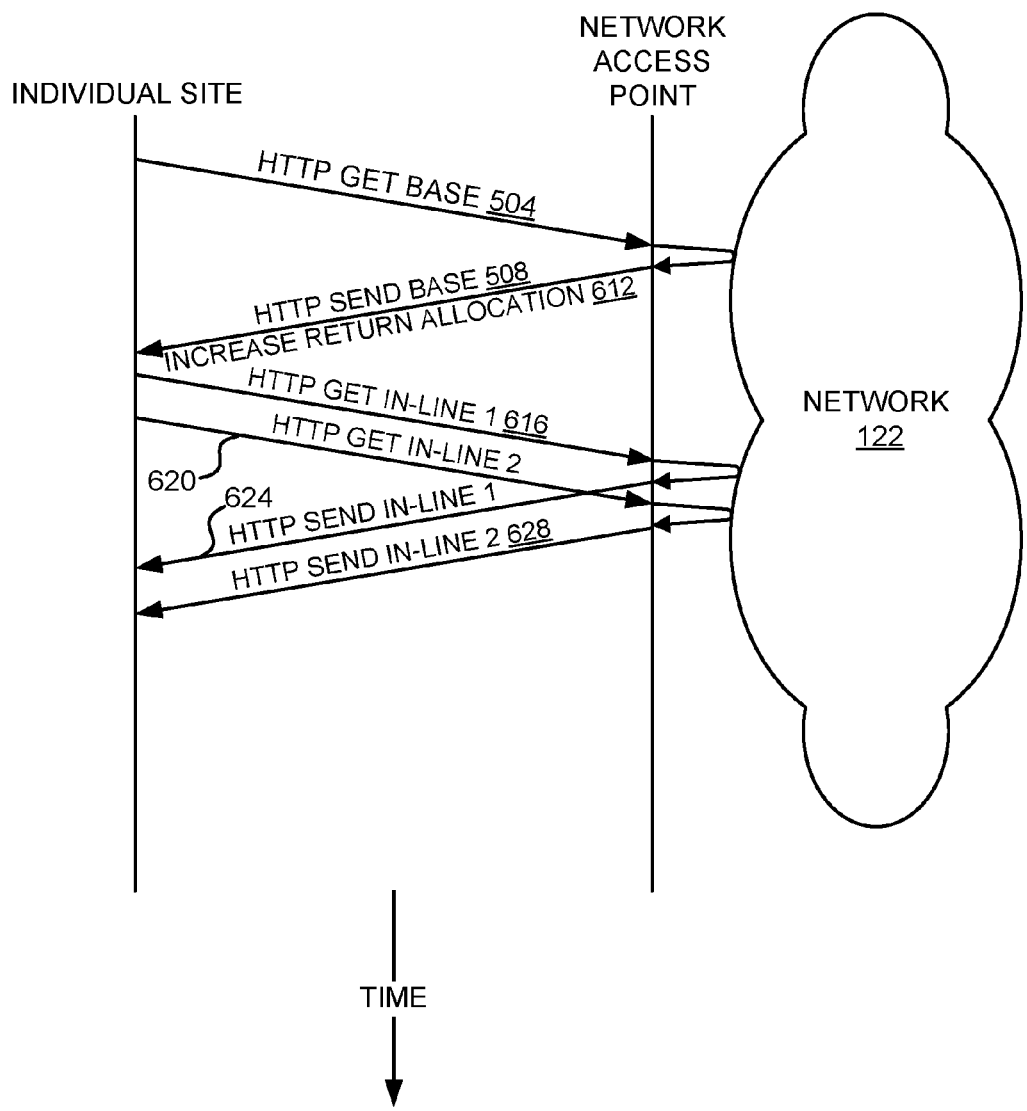
FIG. 6 depicts the same transaction as FIG. 5, except in this scenario, a network access point enhances the process.

FIG. 6 depicts the same transaction as FIG. 5, except in this scenario, the network access point 120 is able to accurately estimate the user's need to request in-line elements, through request-based and/or response-based need estimators 226, 228. Here as in FIG. 5, the user request 504 is made at the upper left corner of the figure. Once the base page is received by the network access point 120 in step 504, however, the network access point 120 detects the referenced in-line elements and sends an additional message 612 to the individual site 104, increasing the return channel allocation for the anticipated requests. Both 'HTTP GET IN-LINE' requests 616, 620 are then sent subsequently via the increased return channel capacity. The requests 616, 620 are forwarded on to the Internet 122 by the network access point 120 and fulfilled shortly thereafter. Finally, both in-line elements are delivered to the user. In this illustrative example, approximately one round trip delay time (from the user to the network access point 120 and back) is saved versus the technique of FIG. 5.

The example illustrated in FIG. 6 is greatly simplified. As a particular modem or user access point 124 can service a number of computers 108 and devices making content requests from the network. The content requests from the individual site 104 are each analyzed and the additional return allocation is communicated to the modem 124. In this way, the content requests are aggregated to step-up or step-down the return allocation for each modem 124 in the system.

The techniques described herein may be implemented by various means. For example, these techniques may be implemented in hardware, software, or a combination thereof. For a hardware implementation, the processing units within a hub 120 or a modem 124 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques, processes and functions described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

While the principles of the disclosure have been described above in connection with specific apparatuses and methods, it is to be clearly understood that this description is made only by way of example and not as limitation on the scope of the disclosure.

What is claimed is:

1. A satellite communication system comprising:
   a user access point; and
   a network access point coupled to the user access point via a satellite communication link having a forward channel and a return channel, the network access point to:
      store usage history associated with a first uniform resource locator (URL), wherein the usage history is based on resources of the return channel that were used following previous requests for the first URL;
      receive a request for a second URL from the user access point;
      determine that the second URL matches the first URL; and
      in response to the determination, allocate resources of the return channel for the user access point based on the stored usage history associated with the first URL.

2. The satellite communication system of claim 1, wherein the usage history is based on resources of the return channel used by other users.

3. The satellite communication system of claim 1, the network access point further to:
   store usage history associated with each of a plurality of URLs including the first URL;
   receive a request for a third URL from the user access point;
   determine that the third URL does not match any of the plurality of URLs; and
   in response to the determination that the third URL does not match any of the plurality of the URLs, allocate resources of the return channel for the user access point based on usage history of a group of one or more URLs of the plurality of URLs.

4. The satellite communication system of claim 3, wherein the group of one or more URLs have the same domain as that of the third URL.

5. The satellite communication system of claim 3, wherein the group of one or more URLs each have a portion matching that of the third URL.

6. The satellite communication system of claim 1, wherein the second URL is not an exact match to the first URL.

7. The satellite communication system of claim 6, wherein the second URL and the first URL have different metadata.

8. The satellite communications system of claim 1, the network access point further to update the stored usage history associated with the first URL based on resources of the return channel used by the user access point following the request.

9. The satellite communication system of claim 8, wherein the resources of the return channel used by the user access point are due to requests for embedded objects within a web page corresponding to the first URL.

10. The satellite communications system of claim 1, wherein the allocated resources of the return channel vary over a time frame.

11. The satellite communications system of claim 10, wherein variation of the allocated resources of the return channel coincide with events associated with receiving a web page corresponding to the first URL.

12. The satellite communications system of claim 1, wherein the usage history is biased toward recent requests.

13. The satellite communications system of claim 1, wherein the allocated resources are relative to a time when the user access point receives a web page corresponding to the first URL.

14. A method comprising:
   storing usage history associated with a first uniform resource locator (URL), wherein the usage history is based on resources of a return channel of a satellite communication link that were used following previous requests for the first URL;
   receiving a request for a second URL from a user access point via the return channel;
   determining that the second URL matches the first URL; and
   in response to the determination, allocating resources of the return channel for the user access point based on the stored usage history associated with the first URL.

15. The method of claim 14, further comprising:
   storing usage history associated with each of a plurality of URLs including the first URL;
   receiving a request for a third URL from the user access point;
   determining that the third URL does not match any of the plurality of URLs; and
   in response to the determination that the third URL does not match any of the plurality of the URLs, allocating resources of the return channel for the user access point based on usage history of a group of one or more URLs of the plurality of URLs.

16. The method of claim 15, wherein the group of one or more URLs have the same domain as that of the third URL.

17. The method of claim 14, further comprising updating the stored usage history associated with the first URL based on resources of the return channel used by the user access point following the request.

18. The method of claim 14, wherein the allocated resources of the return channel vary over a time frame.

19. The method of claim 14, wherein the usage history is biased toward recent requests.

\* \* \* \* \*